US012136498B1

(12) United States Patent
Jenkins et al.

(10) Patent No.: US 12,136,498 B1
(45) Date of Patent: Nov. 5, 2024

(54) SYSTEM AND METHOD FOR MEASURING SPATIALLY RESOLVED VELOCITY AND DENSITY OF AIR FLOWS SIMULTANEOUSLY

(71) Applicant: METROLASER, INC., Laguna Hills, CA (US)

(72) Inventors: Thomas P. Jenkins, Irvine, CA (US); David Feng, Pleasanton, CA (US); Jacob George, Downey, CA (US)

(73) Assignee: METROLASER, INC., Laguna Hills, CA (US)

( * ) Notice: Subject to any disclaimer, the term of this patent is extended or adjusted under 35 U.S.C. 154(b) by 0 days.

(21) Appl. No.: 18/486,076

(22) Filed: Oct. 12, 2023

(51) Int. Cl.
| | |
|---|---|
| *G21K 1/10* | (2006.01) |
| *G01N 9/00* | (2006.01) |
| *G01N 15/0227* | (2024.01) |
| *G01N 21/47* | (2006.01) |
| *G01P 3/68* | (2006.01) |
| *G06T 7/292* | (2017.01) |

(52) U.S. Cl.
CPC ............... *G21K 1/10* (2013.01); *G01N 9/00* (2013.01); *G01N 15/0227* (2013.01); *G01N 21/4795* (2013.01); *G01P 3/685* (2013.01); *G06T 7/292* (2017.01)

(58) Field of Classification Search
CPC ........................................ G21K 1/10
USPC ......................................... 73/53.04
See application file for complete search history.

(56) References Cited

U.S. PATENT DOCUMENTS

| | | | |
|---|---|---|---|
| 6,473,705 B1 * | 10/2002 | Conners | G01F 1/661 |
| | | | 702/100 |
| 7,650,050 B2 * | 1/2010 | Haffner | G01N 21/3504 |
| | | | 356/615 |
| 8,976,351 B2 | 3/2015 | Bivolaru et al. | |
| 2003/0133096 A1 * | 7/2003 | Aroussi | G01P 5/001 |
| | | | 356/28 |

OTHER PUBLICATIONS

Boguszko, Martin et al., "On the use of filtered Rayleigh scattering for measurements in compressible flows and thermal fields," Experiments in Fluids 38, 2005, pp. 33-49.
(Continued)

*Primary Examiner* — Walter L Lindsay, Jr.
*Assistant Examiner* — Philip T Fadul
(74) *Attorney, Agent, or Firm* — Haynes and Boone, LLP

(57) ABSTRACT

A system for measuring velocities and densities of a particle-free flow of molecules is provided. In various embodiments of the disclosure, the system may include a laser configured to form a two-dimensional light sheet for interrogating a flow of molecules at a measurement region with the two-dimensional light sheet. The system may include a first camera coupled with a first filter and a second camera coupled to a second filter. The cameras can be oriented toward the measurement region at a first angle and a second angle, respectively, with respect to a direction of the two-dimensional light sheet. The cameras are configured to capture images of scattered light from the measurement region through the filters. The two-dimensional spatial distribution of density and velocity values of the flow of molecules can be determined based on the images acquired via the first camera and the second camera.

20 Claims, 6 Drawing Sheets

(56) References Cited

OTHER PUBLICATIONS

Doll, Ulrich et al., "Methods to improve pressure, temperature and velocity accuracies of filtered Rayleigh scattering measurements in gaseous flows," Measurement Science and Technology, vol. 27, IOP Publishing Ltd, 2016, pp. 1-9.

Feng, David et al., "Towards Simultaneous Density and Velocity Measurements of Highspeed Flows Using Filtered Rayleigh Scattering," AIAA SCITECH 2022 Forum, 2022, pp. 1-14.

Forkey, J.N. et al., "Accuracy limits for planar measurements of flow field velocity, temperature and pressure using Filtered Rayleigh Scattering," Experiments in Fluids 24, 1998, pp. 151-162.

Forkey, J.N et al., "Demonstration and Characterization of Filtered Rayleigh Scattering for Planar Velocity Measurements," Am Inst Aeronaut Astronaut J, vol. 34, 1996, pp. 442-448.

Laufer, Gabriel et al. "An instrument for the simultaneous measurement of velocity, temperature and density in unseeded air flows," 63 pages.

Zimmermann, M et al., "Hypersonic-helium-flow-field measurements with the resonant Doppler velocimeter," App. Phys. Lett., vol. 37, No. 10, 1980, pp. 885-887.

\* cited by examiner

SYSTEM AND METHOD FOR MEASURING SPATIALLY RESOLVED VELOCITY AND DENSITY OF AIR FLOWS SIMULTANEOUSLY

GOVERNMENT SPONSORED RESEARCH

The present disclosure includes work commenced with the support from Air Force SBIR Phase II program under government contract No. FA9101-20-C-0029.

BACKGROUND

Field of Invention

Embodiments of the present disclosure relate generally to instruments and nonintrusive techniques for measuring velocities and densities of air flows, and more particularly, for example, to a system, an apparatus, and a method for measuring two-dimensional planar distributions of air flow density and velocity without disturbing the air flows using a laser.

The study of aerodynamics is important for the advancement and development of next generation flight systems, including aircrafts, missiles, and any high propulsion vehicles, in order to characterize the flow dynamics around these high performing entities. In particular, measurements of density and velocity in wind tunnel flows are needed for studying the aerodynamics of such aircraft, missiles, and ground vehicles to help developers optimize their designs. In some applications, simultaneous measurements at multiple points in a two-dimensional plane of the flow are determined so that details of the flow field can be determined and compared to mathematical or computer models. It is also important that the measurements themselves do not disturb the flow phenomena of interest, which may be altered otherwise. For example, physical probes inserted into the flow can distort streamlines and alter the velocities and densities being measured. Furthermore, many types of flows do not naturally contain particles, which may be needed by other diagnostics that require the flow to be seeded. Therefore, a nonintrusive technique or a system for measuring velocities and densities that does not require particle seeding is needed in many research and design applications. The disclosed system and method thereof may lead to potential utility as a diagnostic tool for performing measurements of velocity and density in air flows in research facilities for purposes of developing aircraft and high-speed ground vehicles, such as for example, racecars.

SUMMARY

In accordance with one or more embodiments, a system for measuring velocities and densities of a flow of molecules is provided. The system may include a laser configured to form a two-dimensional light sheet and interrogate a flow of molecules at a measurement region with the two-dimensional light sheet; a first filter and a second filter; a first camera oriented toward the measurement region at a first angle with respect to a direction of the two-dimensional light sheet, wherein the first camera is coupled to the first filter and configured to acquire images of scattered light from the measurement region through the first filter; a second camera oriented toward the measurement region at a second angle with respect to the direction of the two-dimensional light sheet, wherein the second camera is coupled to the second filter and configured to acquire images of scattered light from the measurement region through the second filter; and a processor configured to determine a two-dimensional spatial distribution of density and velocity values of the flow of molecules based on the images acquired via the first camera and the second camera.

In various embodiments, the images acquired via the first camera may include data associated with a spatial distribution of density and velocity values of the flow of molecules and the images acquired via the second camera may include data associated with a spatial distribution of density values of the flow of molecules. In one or more embodiments, the first filter and the second filter each comprise an iodine vapor cell. In some embodiments, the first filter and the second filter may each have a filter comprising the same iodine concentration and/or the same iodine fill characteristic.

In various embodiments, the first angle and the second angle may be selected such that the first camera and the second camera are neither anti-parallel nor parallel to one another. In one or more embodiments, the second angle may be selected such that the images acquired via the second camera do not include velocity values of the flow of molecules. In various embodiments, the laser, the first filter, the second filter, the first camera and the second camera may be disposed on a measurement plane and the two-dimensional light sheet is oriented perpendicularly to the measurement plane.

In accordance with one or more embodiments, a method for measuring velocities and densities of a flow of molecules is provided. The method may include scattering a two-dimensional light sheet with a flow of molecules at a measurement region; acquiring one or more first images of scattered light from the measurement region via a first camera coupled to a first filter, wherein the first camera is oriented toward the measurement region at a first angle with respect to a direction of the two-dimensional light sheet; acquiring one or more second images of scattered light from the measurement region via a second camera coupled to a second filter, wherein the second camera is oriented toward the measurement region at a second angle with respect to the direction of the two-dimensional light sheet; determining a two-dimensional spatial distribution of density and velocity values of the flow of molecules based on the one or more first images acquired via the first camera and the one or more second images acquired via the second camera.

In one or more embodiments, the one or more first images acquired via the first camera comprise data associated with a spatial distribution of density and velocity values of the flow of molecules and the one or more second images acquired via the second camera comprise data associated with a spatial distribution of density values of the flow of molecules.

In accordance with one or more embodiments, an apparatus for measuring velocities and densities of a flow of molecules is provided. The apparatus may include a laser configured to form a two-dimensional light sheet for interrogating a flow of molecules at a measurement region; a first camera disposed on a measurement plane with respect to the laser and oriented toward the measurement region at a first angle with respect to a direction of the two-dimensional light sheet, wherein the first camera is configured to acquire images of scattered light from the measurement region at the second angle; and a second camera disposed on the measurement plane with respect to the laser and oriented toward the measurement region at a second angle with respect to the direction of the two-dimensional light sheet, wherein the second camera is configured to acquire images of scattered light from the measurement region at the second angle. In various embodiments, the first angle and the second angle may be selected such that the first camera and the second camera are not directly opposing one another about the measurement region, or neither anti-parallel nor parallel to one another about the measurement region. In one or more embodiments, the second angle may be selected such that the images acquired via the second camera do not include velocity values of the flow of molecules.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
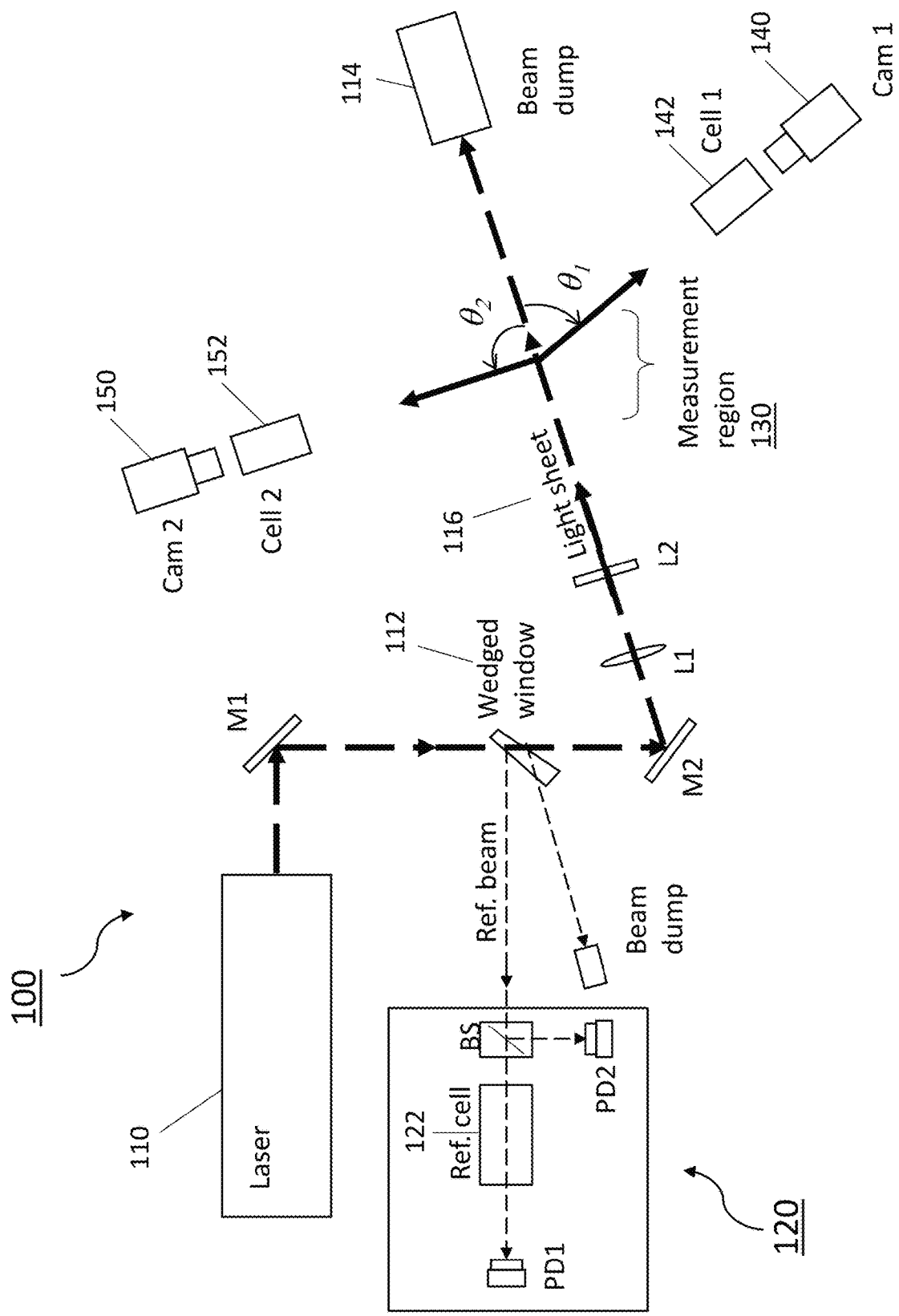
FIG. 1 illustrates a schematic of a system for measuring velocities and densities of a flow of molecules, in accordance with one or more embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

A nonintrusive technique or a system for measuring velocities and densities in a flow of molecules, and methods for performing the measurements are described herein in accordance with one or more embodiments. The disclosed system and method offer capabilities that include, among many others, the measurements of the two-dimensional planar distributions of density and velocity values of the molecules in the flow using laser light scattered from the nitrogen and oxygen molecules in the flow. In the present system layout, the laser beam is configured such that it makes contact with the flow of molecules, where it does not impart any energy into the flow being measured. This is due to the Rayleigh (elastic) scattering process on which the method is based. Using the system with its disclosed configuration, the measurements are performed using a narrow-linewidth laser that can be tuned in wavelength over a small spectral range near 532 nm. However, the disclosed system and method may employ any laser system having any wavelengths that correspond to absorption lines of the (vapor cell) filter so that it provides elastic scattering properties while the laser beam itself does not interfere with the measurements. As disclosed herein, the laser beam can be expanded into a sheet in two dimensions that is directed into the measurement region. Spectrally filtered cameras can then be used to capture images of the sheet from each side, a technique known as filtered Rayleigh scattering (FRS). In FRS, the filter in front of each camera can be an iodine vapor cell, which takes advantage of the effects of density and velocity on light absorption by iodine to produce spatially varying distributions of these quantities. Unlike other implementations of FRS, which rely on different iodine concentrations in each cell to permit the separation of velocity and density, the present implementation disclosed herein can work with the same iodine fill characteristics in each cell. The separation of the two parameters (i.e., the density and velocity information of the flow of molecules) can be achieved geometrically by arranging the two cameras in such a way that one is sensitive primarily to density while the other is also sensitive to velocity. A key aspect of the geometry is that the cameras are aligned such that they do not share the same optical access, thus avoiding stray reflections that could otherwise render the measurement unacceptably noisy. Compared to other FRS approaches, the implementation disclosed herein simplifies the manufacture of the system/instrument/apparatus, leading to a higher fidelity separation of the two parameters and provides better signal-to-background ratios.

It is known that the intensity of the Rayleigh scattered light varies with optical frequency in a way that depends on the scattering angle, temperature, pressure, and velocity of the flow. However, the disclosed implementation of the system and the method herein takes advantage of the fact that many flows of practical importance are nearly isentropic, whereby the effects of temperature and pressure can be recast in terms of density and enable this quantity to be measured, in accordance with one or more embodiments. By using two filtered cameras, for example, to observe the same measurement plane (i.e., the measurement region) from two distinct non-parallel or non-antiparallel angles, the density field can be captured with one camera while the velocity field is captured with the other camera, thus providing high fidelity simultaneous spatial distributions of density and velocity.

The present implementation exemplifies a system that is different from other approaches, for example, an approach that would use the inline-opposed two-camera FRS approach (i.e., the two cameras are directly opposing across the measurement region, or otherwise referred to as parallel or anti-parallel with one another), where a filtered camera is placed on each side of a light sheet passing through the flow with their optical axes aligned antiparallel to each other. In such approach, the camera viewing angles are selected such that the intensities measured by one camera depend only on density and those measured by the other camera depend on both density and velocity. There are two key differences between the "other" approach and the present approach implemented in the system/method disclosed in the embodiments herein. First, with the inline-opposed two-camera FRS approach ("other"), the antiparallel camera axis layout has an inherent noise problem due to reflections of laser light from the cell of the opposing camera. In contrast, the current approach described in the embodiments herein deploy an off-axis geometry (i.e., non-inline-opposed two-camera FRS approach) that would avoid this problem, and consequentially resulting in significantly cleaner images.

Secondly, with the other approach, the density and velocity would be obtained by simultaneously solving two equations and two unknowns at each point in the flow field using the known transmission functions of the two iodine cells, each of which depend on density and velocity. This other approach has a weakness in that it can be highly sensitive to noise in the input signals, especially if the two cells have similar response functions. In contrast, the current approach in the present disclosure takes advantage of the fact that many flows of practical interest are primarily unidirectional. In this case, a sequential solution can be employed for processing the data in which the image from one camera is first processed to obtain the density information. This solution to the density values can then be applied to the image from the second camera to correct for density information, so that the velocity can be obtained using cleaner data with less noise. Thus, the current approach disclosed herein incorporates a measurement geometry that avoids unwanted stray reflections and a data processing method that is significantly simpler and more straightforward than the other approach.

As described with respect to one or more embodiments herein, the disclosed system/apparatus and method includes measurements of spatially resolved density and velocity of air flows can be suitable for use in research, such as in wind tunnel applications. The system/apparatus and method can include various hardware components incorporated into an electro-optical system, software for acquiring and manipulating the raw data, and a method of processing the data to obtain the desired measurements. The hardware can include a laser, two cameras, three iodine vapor cells, and various optical and electronic components. Using the system layout, the beam from the laser can be formed into a light sheet that is directed through the flow region of interest and light that is scattered from the molecules of the flow is captured by the two cameras through the iodine filters. The filtered images are processed using software written in LabView and ImageJ programming languages, among many others, to obtain two-dimensional spatial distributions of both air flow density and velocity. Processing may involve subtraction of image backgrounds, normalization to account for laser beam profile variations, calibration by comparison to known conditions, and use of a model of the iodine cell absorption spectrum to convert pixel intensities into Doppler shifts and thus velocities. The resulting spatial distributions of density and velocity may then be plotted using standard plotting software, such as Tecplot or MATLAB.

To better illustrate and describe the nonintrusive technique or a system/apparatus/method for measuring velocities and densities in a flow of molecules, reference is now made to the following descriptions taken in conjunction with the accompanying FIGS. 1-5.

FIG. 1 illustrates a schematic of a system 100 for measuring velocities and densities of a flow of molecules, in accordance with one or more embodiments. The system 100 can be an instrument that is configured to measure density and velocity in air or nitrogen flows for research, such as in a wind tunnel. In various embodiments, the system 100 can include various hardware, software, and a computing device, for example to use for processing the data. The hardware components of the system 100 can include, but is not limited to, a laser, various optical components, two cameras, and various electronic components. The software can include one or more programs written in LabView and ImageJ, and the methodology that uses this software can produce two-dimensional distributions of density and velocity for the flow of interest.

As illustrated in FIG. 1, the system 100 can include a laser 110 for providing a light source for optical measurements. In one or more embodiments, the laser 110 can include a frequency-tunable injection-seeded pulsed Nd:YAG laser. In various embodiments, the laser 110 can be used in second harmonic mode, for example, at a wavelength of 532 nm, as the light source. In some embodiments, the laser 110 can include the commercially available Continuum Surelite EX SLM. As illustrated in FIG. 1, a laser beam from the laser 110 can be directed through a wedged window 112, which deflects a small percentage of the light to a reference cell system 120 comprising two photodiodes (PD1 and PD2) and an iodine reference cell 122. In one or more embodiments, the reference cell system 120 can be used for precisely measuring the laser frequency.

As further illustrated in FIG. 1, the remainder of the light beam from the laser 110 can be directed by a mirror (M2) into a measurement region 130, after which it is terminated in a beam dump 114. In accordance with various embodiments, the light beam can be formed into a two-dimensional light sheet 116 by cylindrical lenses (L1 and L2) prior to it passing through the measurement region 130, as illustrated in FIG. 1. Further, two cameras 140 and 150 (Cam1 and Cam2, respectively) record images of the light sheet 116 in the measurement region 130. The cameras each have an iodine vapor cell 142 and 152, respectively, placed in front of the respective cameras 140 and 150, that acts as a spectral filter, owing to the absorption properties of the iodine. Camera 140 is oriented at an angle $\theta_1$ with respect to the light sheet 116 while camera 150 is oriented at an angle $-\theta_2$, as illustrated in FIG. 1.

Figure 2:
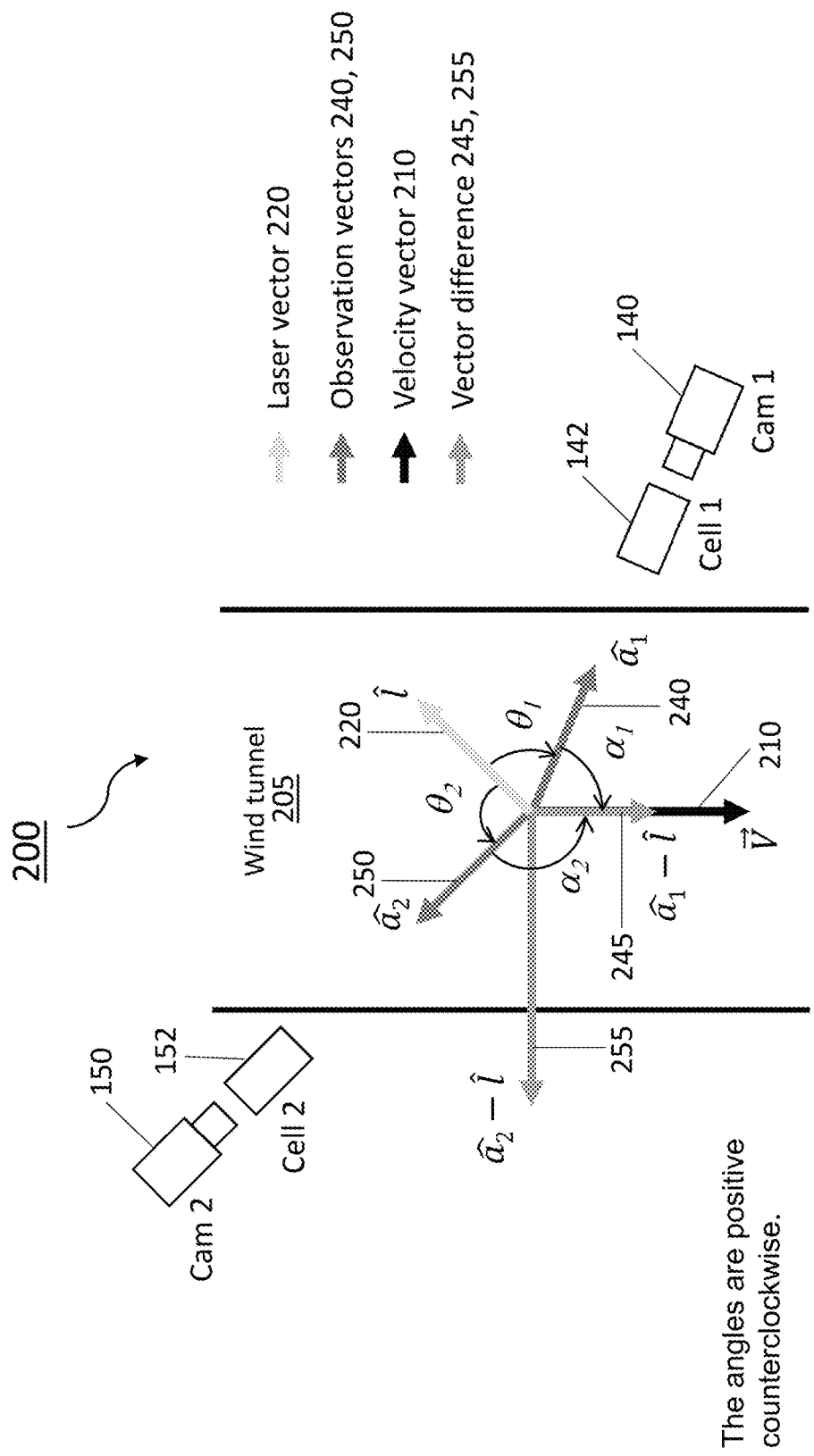
FIG. 2 illustrates a schematic of a vector diagram representing the system illustrated in FIG. 1.

FIG. 2 illustrates a schematic of a vector diagram 200 representing the system 100 illustrated in FIG. 1. The vector diagram 200 depicts a specific orientation of the system 100 with respect to a flow of molecules, represented by a vector 210, for example, in a wind tunnel 205, as illustrated in FIG. 2. As shown in FIG. 2, the angle between the observation vector (e.g., vector 240, vector 250) of a given camera (e.g., camera 140, camera 150) and the mean flow direction (e.g., along vector 210) is denoted by $\alpha$ (e.g., $\alpha_1$, $\alpha_2$). The angles $\alpha$ and $\theta$ are selected to give a Doppler shift of zero for one of the cameras. The Doppler shift is proportional to the dot product of vectors a-l (i.e., vector 245, vector 255) and V (vector 210). In the system 200 illustrated in FIG. 2, camera 150 has a zero Doppler shift since the vector 255 ($a_2$-l) is perpendicular to the mean flow vector 210, V. Thus, the combination of angles $\theta_2$ and $\alpha_2$ are selected such that the mean flow causes no Doppler shift in the light reaching camera 150, along vector 250. Furthermore, the combinations of all angles are chosen such that the optical axis of camera 140 (along vector 240) is offset with respect to the optical axis of camera 150. If the optical axes of the two cameras 140 and 150 are antiparallel, i.e., vector 240 and vector 250 are antiparallel (not shown), reflections from the cell window of one cell, e.g., cell 142 will cause background reflections in the images obtained with the opposite camera (e.g., camera 150), which can severely affect the accuracy of the measurement. Thus, the configuration of the system 100, i.e., the vector diagram 200 as illustrated in FIG. 2, specifies that the optical axes of the two cameras 140 and 150 are non-antiparallel, i.e., vector 240 and vector 250 are not antiparallel as illustrated in FIG. 2, which enables minimizing/elimination of the reflections from the cell window of one cell, e.g., cell 142, in the background reflections of the images obtained with the opposite camera (e.g., camera 150), thereby mitigating unwanted errors/defects in the measurements. The angles are positive counterclockwise. Thus, the angles are negative clockwise. Accordingly, $\theta_1$ is negative as shown; $\alpha_1$ is negative as shown; $\theta_2$ is positive as shown and $\alpha_2$ is positive as shown in FIG. 2.

Figure 3:
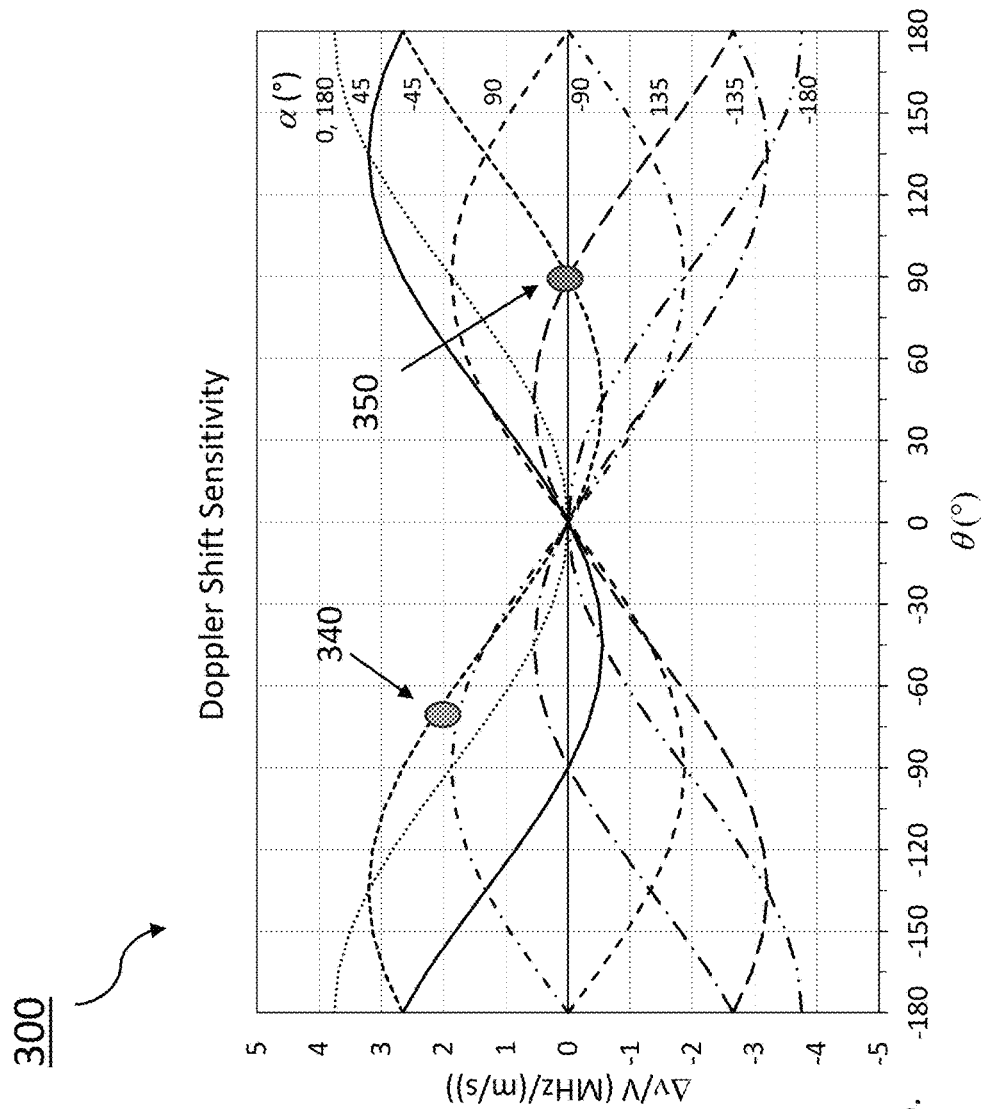
FIG. 3 depicts a plot illustrating various potential positions of the camera placements in the system illustrated in FIG. 1 as functions of doppler shift sensitivity (to velocity), in accordance with one or more embodiments.

FIG. 3 depicts a plot 300 illustrating various potential positions of the camera placements in the system 100 illustrated in FIG. 1 as a function of doppler shift sensitivity (to velocity), in accordance with one or more embodiments. As illustrated in FIG. 3, the Doppler shift is given by $$\Delta v = \frac{1}{\lambda}(\hat{a} - \hat{i}) \cdot \vec{V}, \quad (1)$$

where $\lambda$ is the wavelength of the laser beam from the laser 100 of FIG. 1. For a typical wind tunnel setup, all vectors will lie in the same plane, for which Equation (1) becomes:

$$\frac{\Delta v}{V} = \frac{1}{\lambda}[\cos(\alpha) - \cos(\alpha + \theta)], \quad (2)$$

where angles $\alpha$ and $\theta$ are defined in FIG. 2 and are positive counterclockwise and negative clockwise. The plot 300 of the Doppler shift normalized by velocity magnitude as a function of angles $\alpha$ and $\theta$, can be obtained from Equation (2). This plot can be used as a guide for selecting a geometry that will provide the desired sensitivity to velocity.

To aid in the selection of the measurement geometry, the plot 300 of FIG. 3 gives the sensitivity to Doppler shift for a wide range of angles. In this example case, camera 150 is selected to have an observation angle of $\theta_2=90°$ and a velocity angle of $\alpha_2=135°$. To find this point on the chart, select a value of $90°$ for the observation angle on the horizontal axis and a value of $\alpha_2=135°$ for the velocity angle, which corresponds to the point on the plot 300 marked by the spot 350. This point gives a Doppler shift of zero. For camera 140, for example, a wide range of angles can be selected, the restriction being that the two camera axes are not antiparallel. In order to implement the system layout as disclosed herein, the angle of the camera 140 is selected such that the observation vectors of the two cameras are not antiparallel to ensure that unwanted reflections do not result in the measurements. As an example, $\theta_1=-67.5°$ and $\alpha_1=-67.5°$ are selected for camera 140, which is indicated as spot 340 as illustrated in the plot 300 in FIG. 3.

Figure 4:
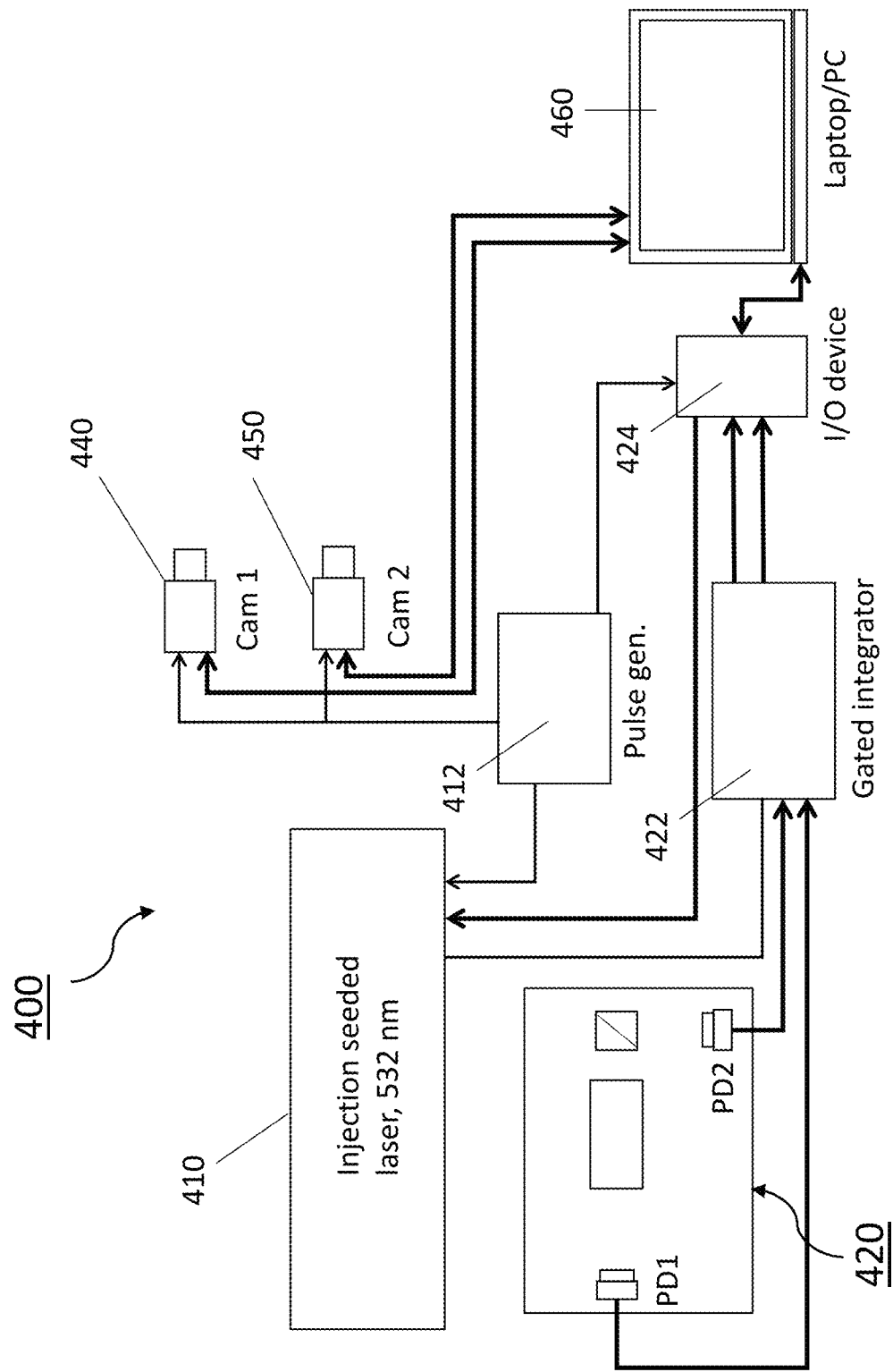
FIG. 4 illustrates a schematic of the electronics system layout of the system illustrated in FIG. 1, in accordance with one or more embodiments.

FIG. 4 illustrates a schematic 400 of the electronics system layout of the system 300 illustrated in FIG. 1, in accordance with one or more embodiments. The layout 400 of the electronic components of the system includes a laser 410, a pulse and delay generator 412, such as the commercially available Berkely Nucleonics BNC 575, serves as the master clock to provide synchronization of the laser 410, cameras 440 and 450, and data acquisition system. Pulsed signals from the reference cell photodiodes (PD1 and PD2), e.g., in a reference cell system 420, are integrated by a two-channel gated integrator 422, which provides voltage signals that are digitized by an input/output device (I/O device) 424, controlled by a laptop or PC 460. During operation, a continuous train of pulses is sent from the pulse generator 412 to the laser 410, cameras 440 and 450, gated integrator 422, and I/O device 424. Images from the cameras 440 and 450 are stored on the laptop/PC 460 along with their corresponding reference cell data for each laser pulse.

Based on the illustrations in FIGS. 1-4, the system 100 is configured for measuring velocities and densities of a flow of molecules in an experimental environment, such as in a wind tunnel. As disclosed herein, the measurement system includes a laser that can be configured to form a two-dimensional light sheet and to interrogate the flow of molecules at the measurement region with the two-dimensional light sheet. The system can also include filters—a first filter and a second filter, and the first camera is oriented toward the measurement region at a first angle with respect to a direction of the two-dimensional light sheet. As illustrated, the first camera is coupled to the first filter and configured to acquire images of scattered light from the measurement region through the first filter. Similarly, the second camera can be oriented toward the measurement region at the second angle with respect to the direction of the two-dimensional light sheet. The second camera is coupled to the second filter and configured to acquire images of scattered light from the measurement region through the second filter. The system can include a computer/a processor that is configured to determine the two-dimensional spatial distribution of density and velocity values of the flow of molecules based on the images acquired via the first camera and the second camera.

In various embodiments of the system, the images acquired from the first camera may include data associated with a spatial distribution of density and velocity values of the flow of molecules and the images acquired via the second camera may include data associated with a spatial distribution of density values of the flow of molecules. In one or more embodiments, the first filter and the second filter each comprise an iodine vapor cell. In some embodiments, the first filter and the second filter may each have a filter comprising the same iodine concentration and/or the same iodine fill characteristic.

In various embodiments, the first angle and the second angle may be selected as described above with respect to FIGS. 2-4 such that the first camera and the second camera are neither anti-parallel nor parallel to one another. In one or more embodiments, the second angle may be selected such that the images acquired via the second camera does not include velocity values of the flow of molecules. In various embodiments, the laser, the first filter, the second filter, the first camera and the second camera may be disposed on a measurement plane and the two-dimensional light sheet is oriented perpendicularly to the measurement plane.

In accordance with one or more embodiments, an apparatus for measuring velocities and densities of a flow of molecules in an experimental environment, such as in a wind tunnel, disclosed herein. The apparatus can include a laser configured to form a two-dimensional light sheet for interrogating a flow of molecules at a measurement region. In the apparatus, the first camera is disposed on a measurement plane with respect to the laser and oriented toward the measurement region at a first angle with respect to a direction of the two-dimensional light sheet. The first camera can be configured to acquire images of scattered light from the measurement region at the second angle. Additionally, the system can include a second camera disposed on the measurement plane with respect to the laser and oriented toward the measurement region at a second angle with respect to the direction of the two-dimensional light sheet. The second camera can be configured to acquire images of scattered light from the measurement region at the second angle. In one or more embodiments, the first angle and the second angle are selected such that the first camera and the second camera are not directly opposing one another about the measurement region, or neither anti-parallel nor parallel to one another about the measurement region. In such embodiments, the second angle may be selected such that the images acquired via the second camera does not include velocity values of the flow of molecules.

In various embodiments of the apparatus, the laser, the first filter, the second filter, the first camera and the second camera are disposed on a measurement plane and the two-dimensional light sheet is oriented perpendicularly to the measurement plane. In various embodiments, the images acquired via the first camera comprise data associated with a spatial distribution of density and velocity values of the flow of molecules and the images acquired via the second camera comprise data associated with a spatial distribution of density values of the flow of molecules. In various embodiments of the apparatus, the first filter and the second filter each comprise an iodine vapor cell. In various embodiments, the first filter and the second filter each have a filter comprising a same iodine concentration and/or a same iodine fill characteristic. In various embodiments, the first angle and the second angle are selected such that the first camera and the second camera are neither anti-parallel nor parallel to one another. In some embodiments, the second angle may be selected such that the images acquired via the second camera does not include velocity values of the flow of molecules.

Figure 5:
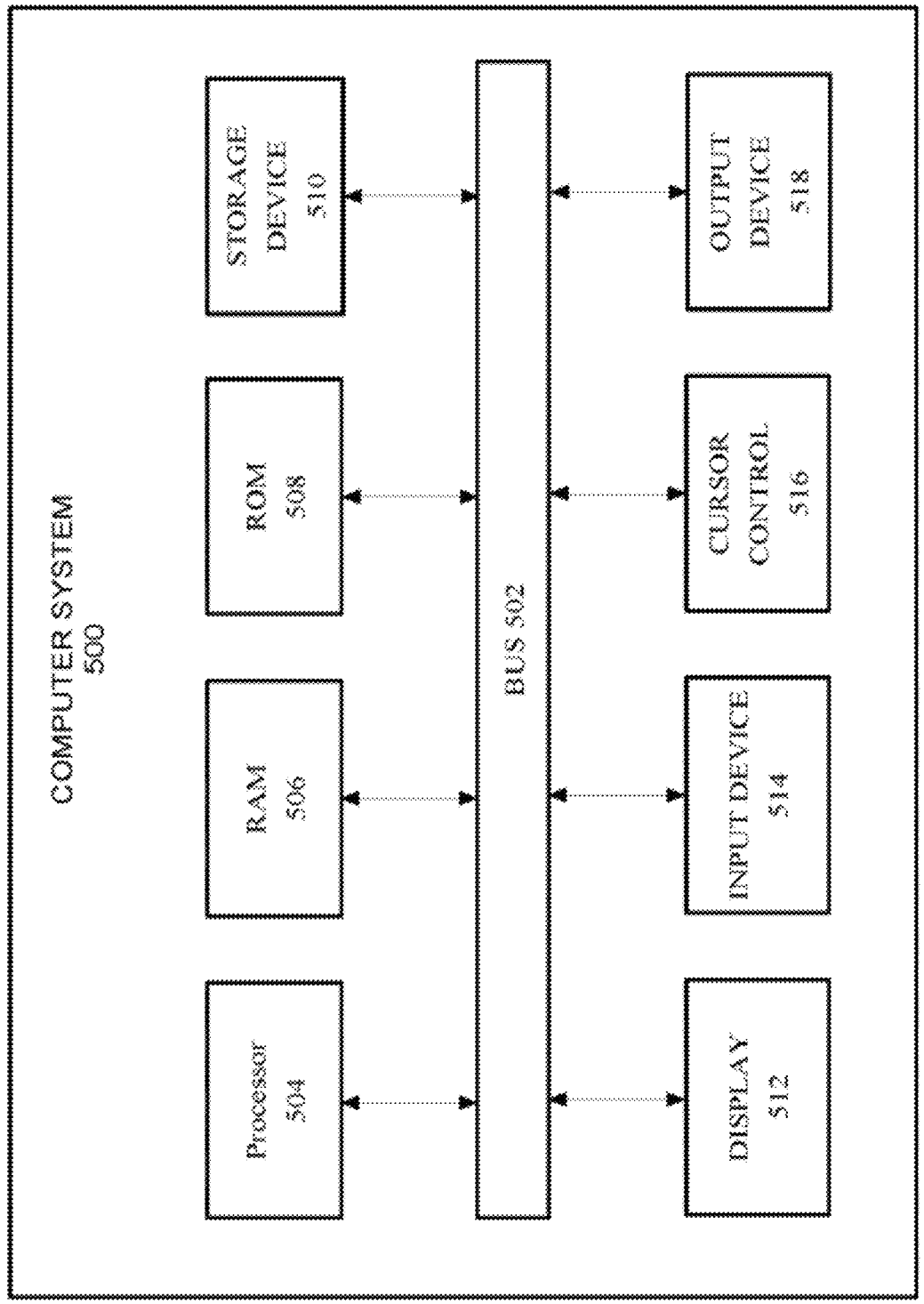
FIG. 5 is a block diagram illustrating an example computer system with which embodiments of the disclosed system and method, or portions thereof may be implemented, in accordance with various embodiments.

FIG. 5 is a block diagram illustrating an example computer system 500 with which embodiments of the disclosed systems and methods, or portions thereof may be implemented, in accordance with various embodiments. For example, the illustrated computer system can be a local or remote computer system operatively connected to a control system for controlling or monitoring the systems and methods of the various embodiments herein. In various embodiments of the present teachings, computer system 500 can include a bus 502 or other communication mechanism for communicating information and a processor 504 coupled with bus 502 for processing information. In various embodiments, computer system 500 can also include a memory, which can be a random-access memory (RAM) 506 or other dynamic storage device, coupled to bus 502 for determining instructions to be executed by processor 504. Memory can also be used for storing temporary variables or other intermediate information during execution of instructions to be executed by processor 504. In various embodiments, computer system 500 can further include a read only memory (ROM) 508 or other static storage device coupled to bus 502 for storing static information and instructions for processor 504. A storage device 510, such as a magnetic disk or optical disk, can be provided and coupled to bus 502 for storing information and instructions.

In various embodiments, computer system 500 can be coupled via bus 502 to a display 512, such as a cathode ray tube (CRT) or liquid crystal display (LCD), for displaying information to a computer user. An input device 514, including alphanumeric and other keys, can be coupled to bus 502 for communication of information and command selections to processor 504. Another type of user input device is a cursor control 516, such as a mouse, a trackball or cursor direction keys for communicating direction information and command selections to processor 504 and for controlling cursor movement on display 512. This input device 514 typically has two degrees of freedom in two axes, a first axis (i.e., x) and a second axis (i.e., y), that allows the device to specify positions in a plane. However, it should be understood that input devices 514 allowing for 3-dimensional (x, y and z) cursor movement are also contemplated herein. In accordance with various embodiments, components 512/514/516, together or individually, can make up a control system that connects the remaining components of the computer system to the systems herein and methods conducted on such systems, and controls execution of the methods and operation of the associated system.

In various embodiments, the computer system 500 includes an output device 518. In various embodiments, the output device 518 can be a wireless device, a computing device, a portable computing device, a communication device, a printer, a graphical user interface (GUI), a gaming controller, a joy-stick controller, an external display, a monitor, a mixed reality device, an artificial reality device, or a virtual reality device.

Consistent with certain implementations of the present teachings, results can be provided by computer system 500 in response to processor 504 executing one or more sequences of one or more instructions contained in memory 506. Such instructions can be read into memory 506 from another computer-readable medium or computer-readable storage medium, such as storage device 510. Execution of the sequences of instructions contained in memory 506 can cause processor 504 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 504 for execution. Such a medium can take many forms, including but not limited to, non-volatile media, volatile media, and transmission media. Examples of non-volatile media can include, but are not limited to, dynamic memory, such as memory 506. Examples of transmission media can include, but are not limited to, coaxial cables, copper wire, and fiber optics, including the wires that comprise bus 502.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, another memory chip or cartridge, or any other tangible medium from which a computer can read.

In addition to computer-readable medium, instructions or data can be provided as signals on transmission media included in a communications apparatus or system to provide sequences of one or more instructions to processor 504 of computer system 500 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein, flow charts, diagrams and accompanying disclosure can be implemented using computer system 500 as a stand-alone device or on a distributed network or shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 500, whereby processor 504 would execute the analyses and determinations provided by these engines, subject to instructions provided by any one of, or a combination of, memory components 506/508/510 and user input provided via input device 514.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Figure 6:
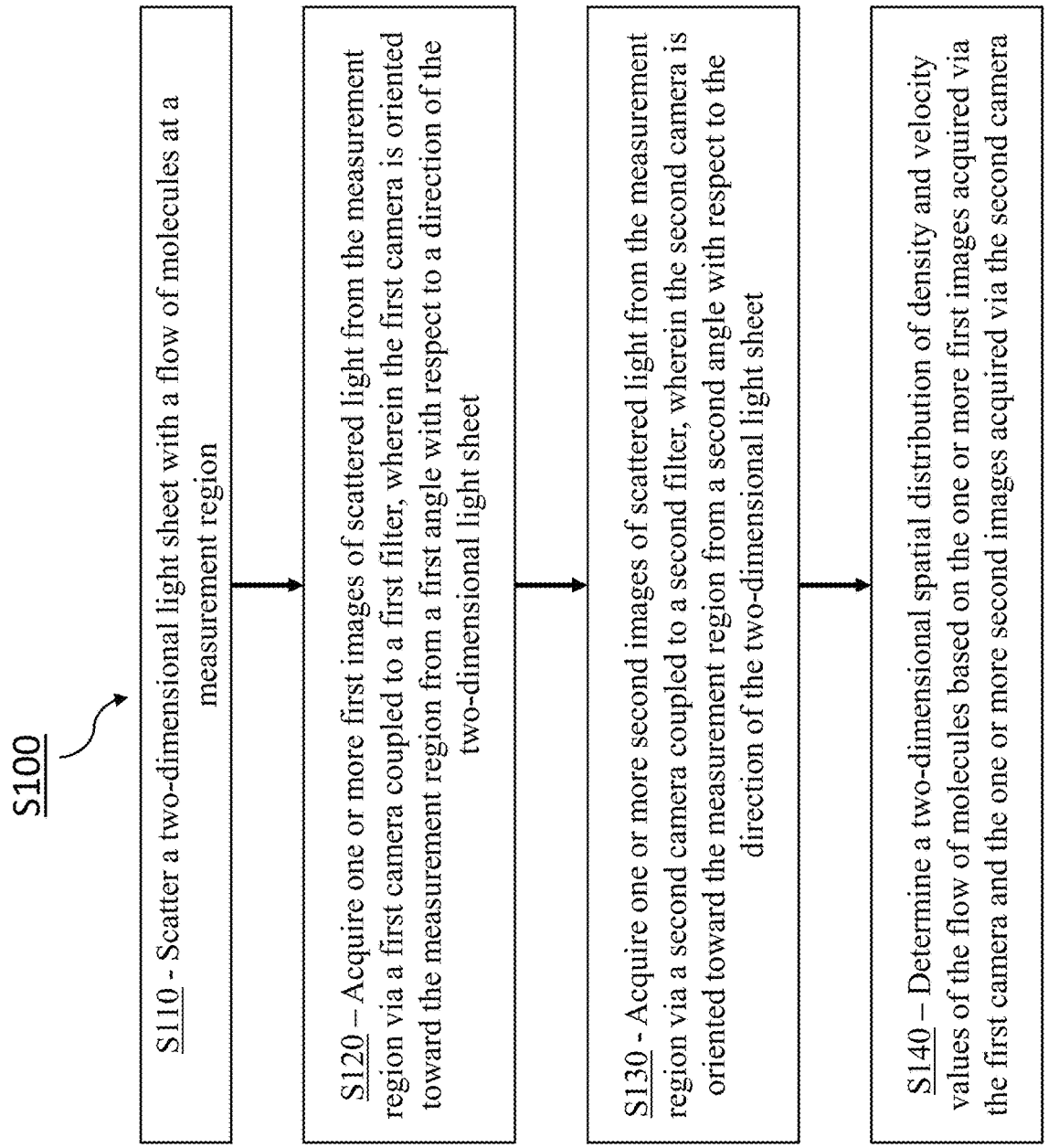
FIG. 6 illustrates a flowchart for a method of measuring velocities and densities of a flow of molecules, in accordance with one or more embodiments.

FIG. 6 illustrates a flowchart S100 for a method of measuring velocities and densities of a flow of molecules, in accordance with one or more embodiments. As illustrated in FIG. 6, the method S100 includes, at step S110, scattering a two-dimensional light sheet with a flow of molecules at a measurement region; at step S120, acquiring one or more first images of scattered light from the measurement region via a first camera coupled to a first filter, wherein the first camera is oriented toward the measurement region at a first angle with respect to a direction of the two-dimensional light sheet; at step S130, acquiring one or more second images of scattered light from the measurement region via a second camera coupled to a second filter, wherein the second camera is oriented toward the measurement region at a second angle with respect to the direction of the two-dimensional light sheet; and at step S140, determining a two-dimensional spatial distribution of density and velocity values of the flow of molecules based on the one or more first images acquired via the first camera and the one or more second images acquired via the second camera.

In various embodiments, step S120 and step S130 may occur simultaneously when the flow of molecules is time-dependent, e.g., the flow of molecules is changing in time. In other words, acquiring the one or more first images and acquiring the one or more second images occur simultaneously, in accordance with one or more embodiments herein.

In various embodiments of the method S100, the one or more first images acquired via the first camera may comprise data associated with a spatial distribution of density and velocity values of the flow of molecules and the one or more second images acquired via the second camera may comprise data associated with a spatial distribution of density values of the flow of molecules.

In various embodiments, the first filter and the second filter each comprise an iodine vapor cell. In various embodiments, the first filter and the second filter each have a filter comprising a same iodine concentration and/or a same iodine fill characteristic.

In various embodiments, the first angle and the second angle are selected such that the first camera and the second camera are neither anti-parallel nor parallel to one another. In various embodiments, the second angle is selected such that the one or more second images acquired via the second camera does not include velocity values of the flow of molecules.

The invention claimed is:

1. A system, comprising:
    a laser configured to form a two-dimensional light sheet and interrogate an air flow of molecules at a measurement region with the two-dimensional light sheet;
    a first filter and a second filter;
    a first camera oriented toward the measurement region at a first angle with respect to a direction of the two-dimensional light sheet, wherein the first camera is coupled to the first filter and configured to acquire images of scattered light from the measurement region through the first filter;
    a second camera oriented toward the measurement region at a second angle with respect to the direction of the two-dimensional light sheet, wherein the second camera is coupled to the second filter and configured to acquire images of scattered light from the measurement region through the second filter; and
    a processor configured to determine a two-dimensional spatial distribution of density and velocity values of the air flow of molecules based on the images acquired via the first camera and the second camera,
        wherein the first angle and the second angle are selected such that a Doppler shift measured at either the first angle or the second angle is zero.

2. The system of claim 1, wherein the images acquired via the first camera comprise data associated with a spatial distribution of density and velocity values of the air flow of molecules and the images acquired via the second camera comprise data associated with a spatial distribution of density values of the air flow of molecules.

3. The system of claim 2, wherein the second angle is selected such that the images acquired via the second camera comprise data associated with the density values of the air flow of molecules and not velocity values of the air flow of molecules.

4. The system of claim 1, wherein the first filter and the second filter each comprise an iodine vapor cell.

5. The system of claim 1, wherein the first filter and the second filter each have a filter comprising a same iodine concentration and/or a same iodine fill characteristic.

6. The system of claim 1, wherein the first angle and the second angle are selected such that the first camera and the second camera are neither anti-parallel nor parallel to one another.

7. The system of claim 1, wherein the laser, the first filter, the second filter, the first camera and the second camera are disposed on a measurement plane and the two-dimensional light sheet is oriented perpendicularly to the measurement plane.

8. The system of claim 1, wherein the first camera and the second camera are further configured to simultaneously acquire the respective images of scattered light from the measurement region, respectively, through the first filter and the second filter.

9. A method, comprising:
scattering an air flow of molecules with a two-dimensional light sheet at a measurement region;
acquiring one or more first images of scattered light from the measurement region via a first camera coupled to a first filter, wherein the first camera is oriented toward the measurement region from a first angle with respect to a direction of the two-dimensional light sheet;
acquiring one or more second images of scattered light from the measurement region via a second camera coupled to a second filter, wherein the second camera is oriented toward the measurement region at a second angle with respect to the direction of the two-dimensional light sheet; and
determining a two-dimensional spatial distribution of density and velocity values of the air flow of molecules based on the one or more first images acquired via the first camera and the one or more second images acquired via the second camera,
wherein the first angle and the second angle are selected such that a Doppler shift used in determining the two-dimensional spatial distribution of density and velocity values of the air flow of molecules at either the first angle or the second angle is zero.

10. The method of claim 9, wherein acquiring the one or more first images and acquiring the one or more second images occur simultaneously.

11. The method of claim 9, wherein the one or more first images acquired via the first camera comprise data associated with a spatial distribution of density and velocity values of the air flow of molecules and the one or more second images acquired via the second camera comprise data associated with a spatial distribution of density values of the air flow of molecules.

12. The method of claim 11, wherein the second angle is selected such that the one or more second images acquired via the second camera comprise data associated with the density values of the air flow of molecules and not velocity values of the air flow of molecules.

13. The method of claim 9, wherein the first filter and the second filter each comprise an iodine vapor cell.

14. The method of claim 9, wherein the first filter and the second filter each have a filter comprising a same iodine concentration and/or a same iodine fill characteristic.

15. The method of claim 9, wherein the first angle and the second angle are selected such that the first camera and the second camera are neither anti-parallel nor parallel to one another.

16. A measurement apparatus, comprising:
a laser configured to form a two-dimensional light sheet for interrogating an air flow of molecules at a measurement region;
a first camera disposed on a measurement plane with respect to the laser and oriented toward the measurement region at a first angle with respect to a direction of the two-dimensional light sheet, wherein the first camera is configured to acquire images of scattered light from the measurement region at the first angle; and
a second camera disposed on the measurement plane with respect to the laser and oriented toward the measurement region at a second angle with respect to the direction of the two-dimensional light sheet, wherein the second camera is configured to acquire images of scattered light from the measurement region at the second angle,
wherein the first angle and the second angle are selected such that the first camera and the second camera are not directly opposing one another about the measurement region, or neither anti-parallel nor parallel to one another about the measurement region, and
wherein the second angle is selected such that the images acquired via the first camera comprise data associated with a spatial distribution of density and velocity values of the air flow of molecules and the images acquired via the second camera comprise data associated with a spatial distribution of density values and not velocity values of the air flow of molecules.

17. The apparatus of claim 16, further comprising:
a first filter coupled to the first camera, and
a second filter coupled to the second camera, wherein the laser, the first filter, the second filter, the first camera and the second camera are disposed on a measurement plane and the two-dimensional light sheet is oriented perpendicularly to the measurement plane.

18. The apparatus of claim 17, wherein the first filter and the second filter each comprise an iodine vapor cell.

19. The apparatus of claim 17, wherein the first filter and the second filter each have a filter comprising a same iodine concentration and/or a same iodine fill characteristic.

20. The apparatus of claim 16, wherein the first camera and the second camera are further configured to simultaneously acquire the respective images of scattered light from the measurement region, respectively, at the first angle and the second angle.

* * * * *